J. GROHS.
CARRIER ATTACHMENT FOR GRAIN BINDERS OR HARVESTERS.
APPLICATION FILED SEPT. 16, 1919.

1,362,617. Patented Dec. 21, 1920.

Inventor
John Grohs.

By Geo. P. Kimmel
Attorney

J. GROHS.

CARRIER ATTACHMENT FOR GRAIN BINDERS OR HARVESTERS.

APPLICATION FILED SEPT. 16, 1919.

1,362,617.

Patented Dec. 21, 1920.

Inventor

John Grohs.

By Geo. P. Kimmel

Attorney

UNITED STATES PATENT OFFICE.

JOHN GROHS, OF VAUGHN, MONTANA.

CARRIER ATTACHMENT FOR GRAIN BINDERS OR HARVESTERS.

1,362,617. Specification of Letters Patent. Patented Dec. 21, 1920.

Application filed September 16, 1919. Serial No. 324,109.

*To all whom it may concern:*

Be it known that I, JOHN GROHS, a citizen of the United States, residing at Vaughn, in the county of Cascade and State of Montana, have invented certain new and useful Improvements in Carrier Attachments for Grain Binders or Harvesters, of which the following is a specification.

The invention relates to a carrier attachment for grain binders or harvesters, and more particularly to the class of grain carriers for harvesting machines.

The primary object of the invention is the provision of an attachment of this character, wherein the same is to be substituted for a binder on a grain harvester to enable the carrying of grain and the dropping of the same in windrows without the necessity of binding the same with twine or otherwise, thereby enabling the harvesters to cut short grain and carry it without said grains being scattered.

Another object of the invention is the provision of a carrier of this character, wherein the necessity of the use of twine for the binding of the grain is eliminated and also will avoid the necessity of shocking grain after it has been cut.

A further object of the invention is the provision of a grain carrier of this character, wherein the construction thereof is novel in form so that the same can be mounted upon different types of grain harvesters, without necessitating any changes or alterations in the harvester and also will permit the use of a binder or the carrier, as the occasion may require.

A still further object of the invention is the provision of a grain carrier of this character, which is comparatively simple in construction, very reliable and efficient in its purpose, strong, durable, and inexpensive to manufacture and install.

With these and other objects in view, the invention consists of the features of construction, combination and arrangement of parts, as will be hereinafter fully described, illustrated in the accompanying drawings, and pointed out in the claims hereunto appended.

In the accompanying drawings.

Similar reference characters indicate corresponding parts throughout the several views in the drawings.

Figure 1:
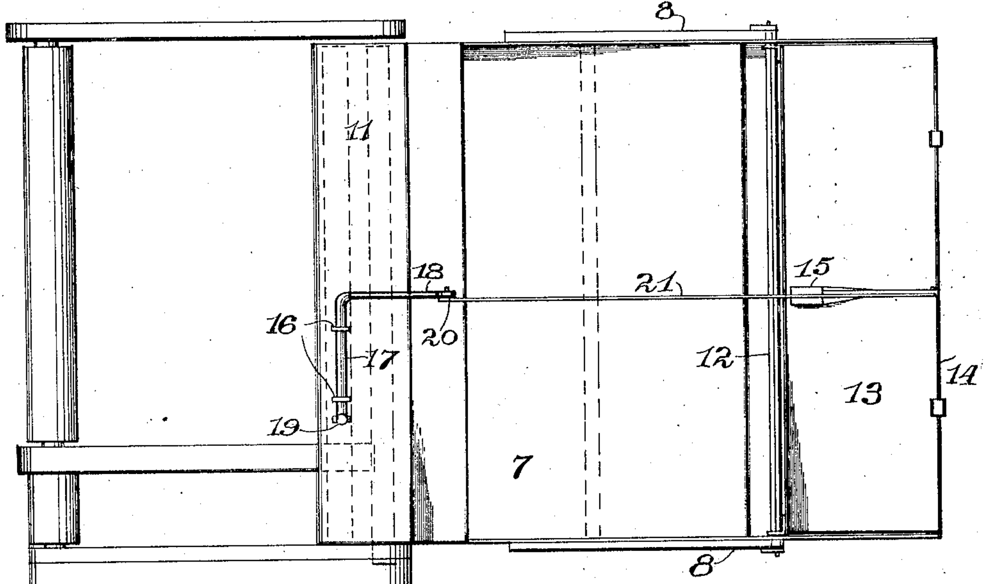
Figure 1 is a top plan view of the attachment constructed in accordance with the invention.
Figure 2:
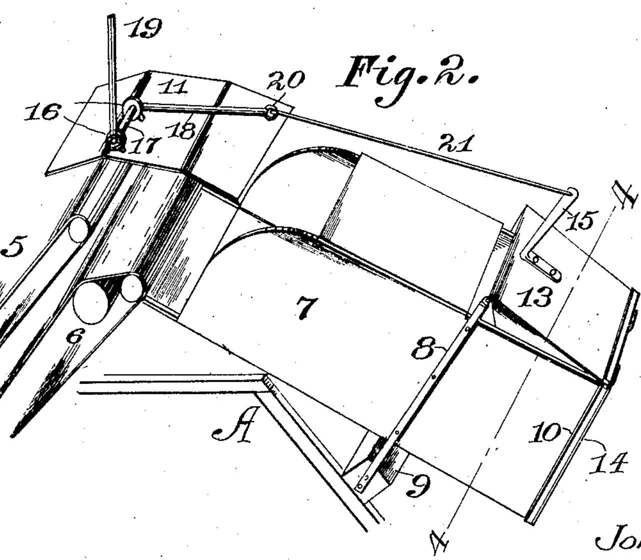
Fig. 2 is a fragmentary perspective view of a portion of a grain harvester, known as the Deering type, showing the grain carrier attachment applied.

Referring to the drawings in detail A designates generally a portion of the frame of the grain harvester at the elevator side thereof and in which are located the upper and lower conveyers 5 and 6 respectively, which are of the ordinary well known construction, the path of the grain being between the adjacent stretchers of the conveyers 5 and 6 as is usual.

Figure 3:
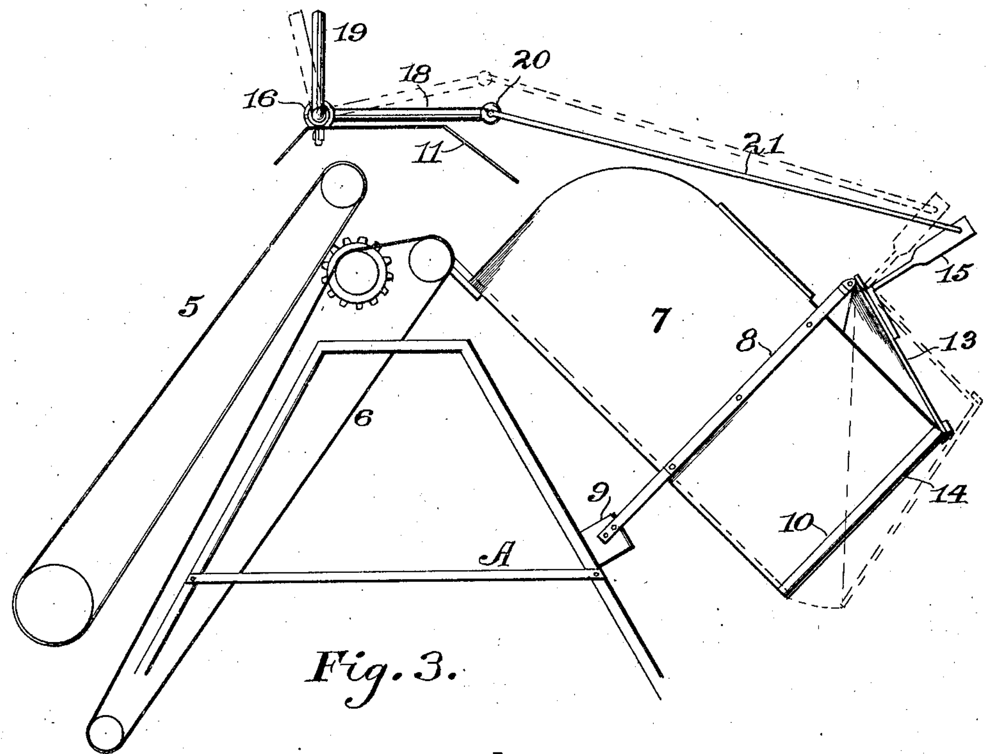
Fig. 3 is an enlarged side elevation, showing by full lines the grain carrier in closed position and by dotted lines the said carrier in open position.
Figure 4:
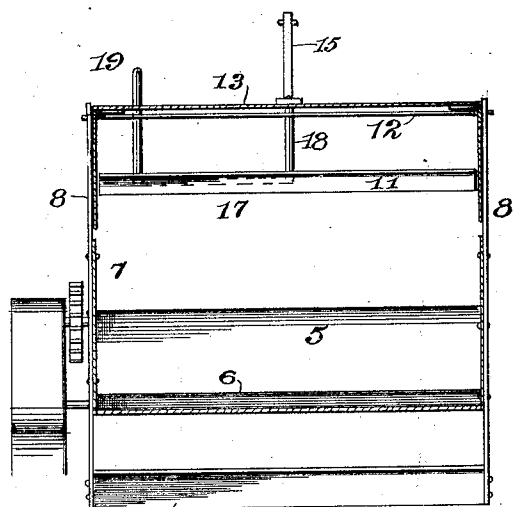
Fig. 4 is a sectional view on the line 4—4 of Fig. 2.

Supported upon the frame A is the grain carrier attachment comprising a scoop like body 7 which is arranged in a laterally inclined position and is open at the upper and lower ends thereof, the support for the body 7 being in the form of standards 8, which are arranged on opposite sides of said body and have their inner or lower ends suitably fixed to a cross sill or bar 9 of the frame A, as is clearly shown in Fig. 3 of the drawings.

The lower end of the body 7 of the grain carrier constitutes the discharge mouth thereof and the same is reinforced through the medium of an angle iron 10, while the opposite intake end of the body 7 is suitably fastened at the bottom of said body to the frame A, so that grain leaving the conveyer will enter the body 7 of the grain carrier. Superposed above the intake end of the body 7 and the uppermost ends of the conveyers 5 and 6 is a shield or guard 11 which is mounted in place on the frame A in any suitable manner, the shield or guard being of the usual construction and serves to deflect the grain within the carrier as will be clearly apparent.

The standards 8 project beyond the top or upper side of the body 7 and have journaled therein a transversely disposed pivot rod 12, to which is fixed a hanger 13 carrying an end cover or gate 14, which is adapted to normally close the lower open discharge end of the body 7 and on the opening of the cover or gate the contents of the carrier can be delivered therefrom onto the ground.

Fixed to the hanger 13 is a substantially L-shaped arm 15, while mounted upon the shield or guard 11 are bearings 16 in which is journaled the axle end portion 17 of a crank 18 and fixed to this axle end portion 17 is a handle or manually operable lever 19. Connected to the eye end as at end 20 of the crank 18 is a rod 21, the same being also connected to the L-shaped arm 15, so that on manipulating the handle or lever 19 motion will be imparted to the arm 15 for effecting the raising or lowering of the cover or gate 14, the handle or lever being in convenient reach of the operator of the harvester.

When the lever 19 is pulled upon by the operator of the harvester it causes the cover or gate to be opened and by virtue of the downward reclination of the attachment the grain therein drops to the ground in a neat compact mass.

From the foregoing it is thought that the construction and manner of operation of the grain carrier attachment will be clearly understood and also the mounting thereof upon the harvester, therefore a more extended explanation has been omitted.

What is claimed is:

1. A grain carrier of the character described, comprising a body adapted to be supported upon a harvester at a lateral inclination and open at opposite ends, a cover for the lowermost open end, a rocking hanger for the cover, an arm on the hanger, a hand operable lever adapted to be mounted upon a harvester and having connection with the arm.

2. A grain carrier of the character described, comprising a body adapted to be supported upon a harvester at a lateral inclination and open at opposite ends, a cover for the lowermost open end, a rocking hanger for the cover, an arm on the hanger, a hand operable lever adapted to be mounted upon a harvester and having connection with the arm, and side wings formed on the cover to telescope over the sides of the body when the cover is closed.

In testimony whereof I affix my signature hereto.

JOHN GROHS.